SYNCHRONIZED STARTING OF REDUNDANT DIGITAL DIVIDERS

Filed May 3, 1968 2 Sheets-Sheet 1

INVENTOR
GABOR SCHLISSER
BY Manotti J. Lombardi
ATTORNEY

SYNCHRONIZED STARTING OF REDUNDANT DIGITAL DIVIDERS

Filed May 3, 1968 2 Sheets-Sheet 2

INVENTOR
GABOR SCHLISSER
BY Menotti J. Lombardi
ATTORNEY

United States Patent Office 3,538,344
Patented Nov. 3, 1970

3,538,344

SYNCHRONIZED STARTING OF REDUNDANT DIGITAL DIVIDERS

Gabor Schlisser, Tenafly, N.J., assignor to International Telephone & Telegraph Corporation, Nutley, N.J., a corporation of Delaware

Filed May 3, 1968, Ser. No. 726,299
Int. Cl. G06f *11/08*
U.S. Cl. 307—219 10 Claims

ABSTRACT OF THE DISCLOSURE

An automatic starting arrangement for redundant digital dividers in which each divider can start when its opposite unit is not operating and is caused to start in synchronism when its opposite divider unit is operating.

BACKGROUND OF THE INVENTION

In general this invention relates to redundant digital dividers and more particularly to the synchronized starting of redundant digital dividers.

In many instances in order to achieve the high degree of reliability required of present electronic systems, functional redundancy must be employed. A commonly occurring example of this is two redundant chains of digital dividers which are cross-coupled at certain intervals, so as to allow failures to be repaired without interruption of the output signal. To permit cross-coupling and to insure that the outputs of the last dividers are in time synchronism a special starting procedure must be employed. Each divider must be capable of starting when its opposite unit is not operating and it must start in synchronism when its opposite is operating. A fully automatic procedure that performs these functions is described herein.

SUMMARY OF THE INVENTION

It is therefore an object of this invention to provide an automatic starting arrangement for redundant digital dividers.

When, for example, a divider card is inserted in a redundant chain and power is applied, it will automatically perform according to the invention the following functions in sequence. It will reset each stage of its divider to "0" and inhibit the output signal. It will check the operating status of the same opposite divider. If the opposite divider is not operating the reset and inhibit conditions are removed and the divider starts normal operation. If the opposite divider is operating it provides a start signal to the quiescent divider when all its stages are in the "0" state. This signal removes the reset and inhibit conditions so that when the next input pulse arrives, which is simultaneously applied to the two opposite dividers, the dividers will start operating in time synchronism. Once the quiescent divider has started it is no longer effected by the operating status of its parallel divider.

BRIEF DESCRIPTION OF THE DRAWING

The accompanying description will be more clearly understood if reference is made to the accompanying drawings in which.

DESCRIPTION OF THE PREFERRED EMBODIMENT

Figure 1:
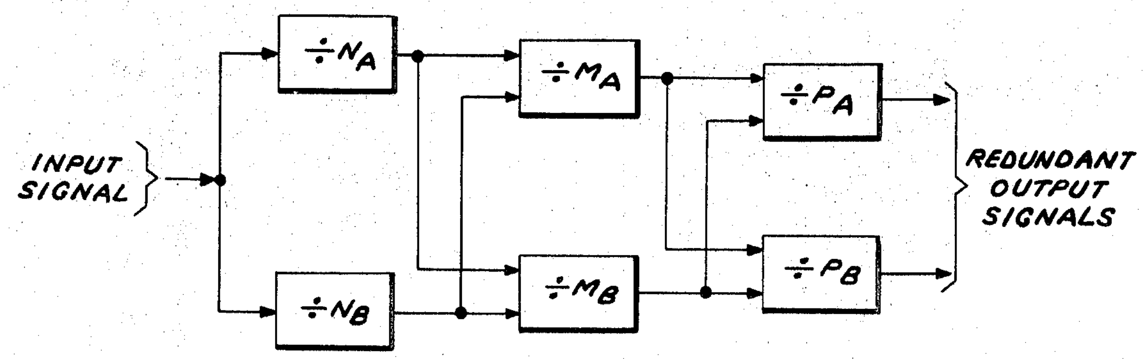
FIG. 1 shows redundant divider chains which are cross-coupled according to the invention.

Referring to FIG. 1, there is shown redundant divider chains A and B, in which chain A comprises divide by N circuit, divide by M circuit, divide by P circuit which are cross-coupled to chain B comprising divide by N circuit, divide by M and divide by P circuits. This arrangement produces redundant output signals regardless of the interruption or repair of one of the individual circuits of the chain. For example, if a divide by M circuit should fail, the output will still retain two output signals due to the fact that the output from the divide by N divider is cross-coupled to both divide by M dividers. However, to insure that there will be two signals, the two signal inputs to the divide by M circuit from chain A and B dividers must be in synchronism. The divide by M operation and each following divider operation must start in synchronism. Therefore, each divider must be capable in the chain of starting when its opposite unit is not operating and it must start in synchronism when its opposite is operating.

Figure 2:
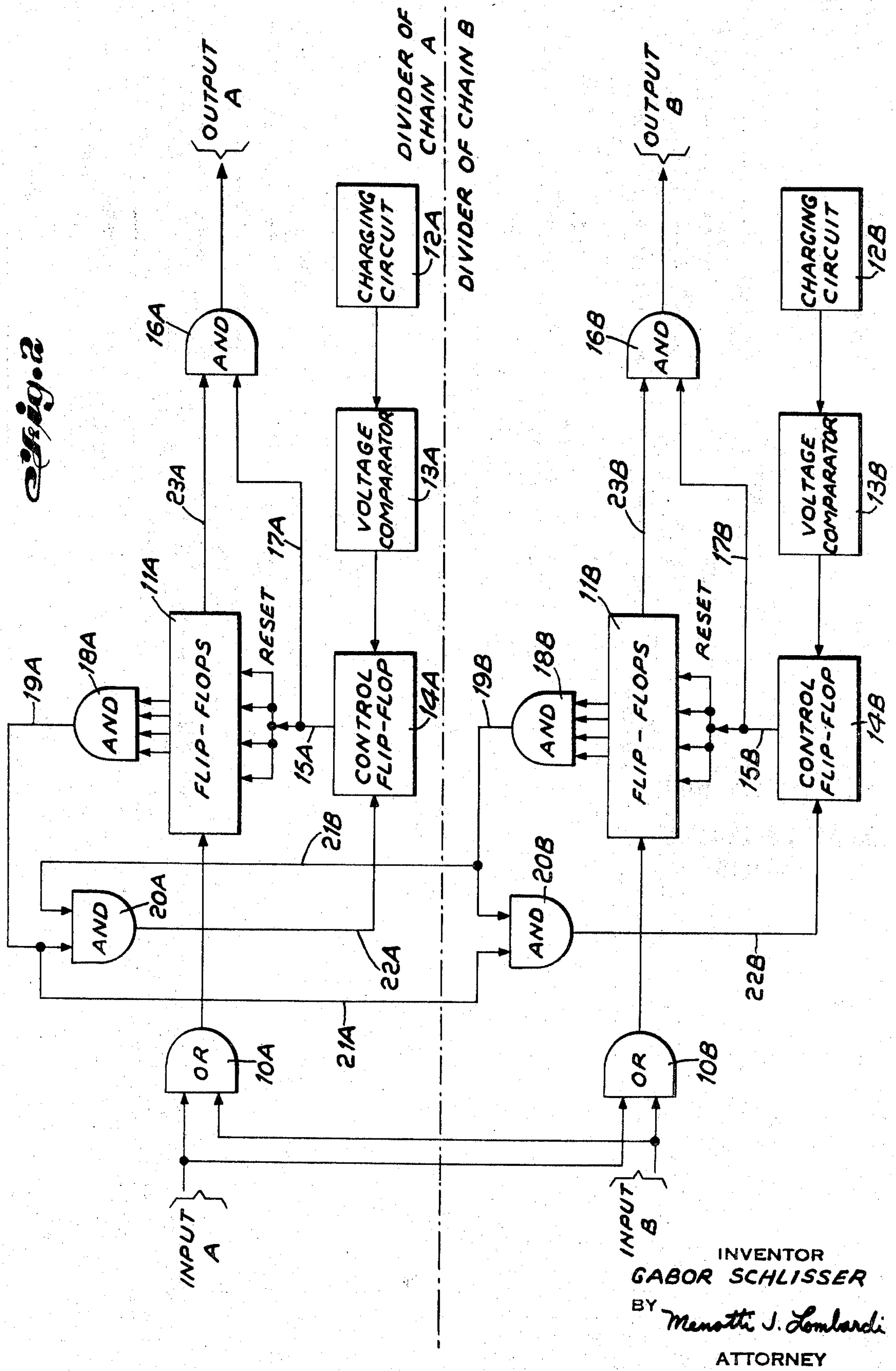
FIG. 2 illustrates the automatic starting system for a divider from chain A and B of FIG. 1.

Referring additionally to FIG. 2, there is shown a divider circuit of chain B and a divider circuit of chain A. It is assumed that each divider represents a replaceable printed circuit card which is to be inserted in a proper location due to the failure of an existing divider circuit. Power is applied and automaticly the circuits performed the following operations. Two input signals A and B are cross-coupled to input OR gates 10A and 10B. The OR gates are coupled to one input of the divider stage flip-flops, 11A and 11B. The other input to the flip-flops 11A and 11B comes from a reset means comprising respectively charging circuits 12A and B, a voltage comparator 13A and B and a control flip-flop 14A and B. The output from the control flip-flops via associate lines 15A and B reset flip-flops 11A and 11B, and also inhibit output signal AND gates 16A and B from producing an output via lines 17A and B.

The first output from divider flip-flops 11A and B are respectively coupled to a first AND gating arrangement 18A and B which in turn produces an indicating signal on lines 19A and B indicating that the flip-flops have been reset. This signal is additionally coupled to a second AND gating arrangement 20A and B, i.e. by line 21A to AND gating means 20B and by line 21B to AND gating means 20A. Upon coincidence of the two input signals to AND gates 20A and B, a feedback signal via line 22A or 22B switches control flip-flop 14A or 14B to remove the inhibit signal from line 17A or 17B. This permits the divider output via line 23A and B to be produced at output A and B. It must be remembered that either divider A or divider B may be started first, or divider A may be in operation and divider B to start its operation, in which case, divider B would sink its operation with that divider A in the manner more fully understood by reference to FIG. 3 hereinafter described.

Generally, when the divider A or B is turned on, by a power source coupled to the charging circuit, the following functions are performed in sequence. The divider flip-flops are reset by having each stage set to "0" and the output AND gate is inhibited. The check is then made via the first AND gates 18A or 18B of the status of the identical opposite divider. If the opposite divider is not operating, the reset and inhibit conditions are removed and the divider will start its normal operation. However, if the opposite divider is operating it provides a start signal to the quiescent divider when all its stages are in the "0" state. This is accomplished by the feedback lines 22A or 22B which switch the appropriate control flip-flop 14A or 14B to remove the inhibit pulse on lines 17A or B and open AND gates 16A or B. The next input pulse (inputs A and B), which is simultaneously applied to both dividers, will simultaneously start operating the dividers in time synchronism. Once a divider has started it is no longer affected by the operation of its opposite parallel divider.

The charging circuits 12A and B and the voltage comparator 13A and B combine to assure that the respective control flip-flop 14A and 14B will be in the required state just after the power is turned on. In this state the output of the respective control flip-flop inhibits the associated output AND gate and the stages of the dividing flip-flops are all reset. If the opposite divider is not operating, or when it reaches the reset state, then the state of the control flip-flop is changed allowing the dividing flip-flops to operate and provide the output signal. In this manner the new divider is started in synchronism with the opposite identical divider.

Figure 3:
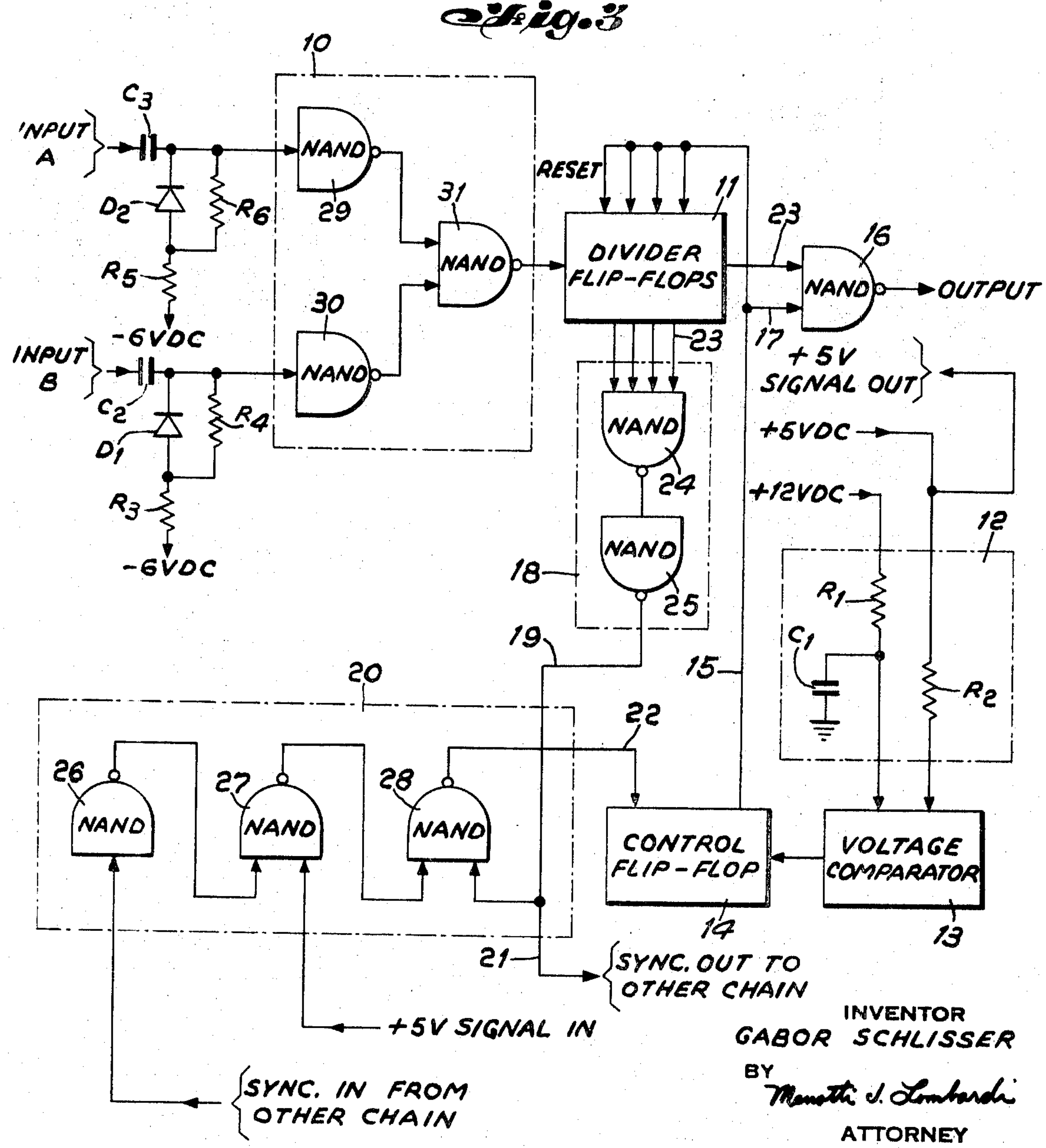
FIG. 3 is a more detailed block diagram of a divider from either chain A or B shown in FIG. 2.

Referring additionally to FIG. 3, there is shown a more detailed arrangement of a divider belonging to either chain A or chain B in FIG. 2. The references of the blocks shown do not contain an alphabetic character indicating that the block may be used in either divider chain A or divider chain B. The charging circuit 12 comprises two resistors R1, R2 and a capacitor C1. The charging circuit is coupled to a 12 volt source of DC potential and a 5 volt source of DC potential. The 5 volt signal source is also coupled to the 5 volt signal input source of the AND gate 20. Outputs from the charging circuit are coupled to a voltage comparator 13 which in turn is coupled to a control flip-flop 14. The output 15 from the control flip-flop is used to set the divider flip-flops 11.

An output from each stage is produced via lines 23 to AND gate 18 comprising NAND gates 24 and 25. The output from these gates is coupled by line 19 to NAND gate 28 and by line 21 to the other chain gate 20 as indicated in FIG. 2. AND gate 20 comprises NAND gates 25, 26 and 27. The signal from control flip-flop 14 on line 17 inhibits AND gate 16 to prevent an output until the sequence of gates 18 and 20 are completed.

The inputs A and B are coupled by means of coupling components C2 and C3, to D1, D2, and R3, R4, R5, R6. R3. and R5 are coupled to a negative source of potential. OR gate 10 comprises two parallel NAND gates 28, 29 whose output is coupled to NAND gate 30. The inverted output provides an input signal to divider 11.

As the output voltage from control flip-flop 14 inhibits AND gate 16 and resets dividers 11, the output indication from NAND gates 24, 25 produces a first input to NAND gate 28 and at the same time, a synch output signal to the other NAND gate chain. NAND gate 27 receives a 5 volt signal input and also receives a synch input signal via NAND gate 26 which, if an input is received via 26, no output is produced on line 22 according to the logic to remove the inhibit pulse on line 17. However, on the following signal when all stages are reset to "0" and line 19 is at "0" state, then AND 28 will produce an output signal on line 22 and remove the inhibit from AND gate 16 to allow normal operation of the dividers.

In this automatic starting system, the charging circuit and the voltage comparator combined to assure that the control flip-flop will be in the required state just after the power is turned on. In this state the output of gate 16 is inhibited and the dividing flip-flops are all reset. If the opposite divider is not operating, or when it reaches the reset state, then will the state of the control flip-flop be changed allowing for the dividing flip-flops to operate and provide the output signal. In this manner the new divider is forced to start in synchronism with the opposite identical divider when it is operating.

In summary referring to FIGS. 2 and 3, when the power is applied to the charging circuit and the OR gate input, the following sequences are performed. Each stage of the divider is set to "0" and the output signal is inhibited. The operating status of the opposite identical divider is checked by line 21. If the opposite divider is not operating then there is no synch input signal from the other chain to NAND gate 26 and the inhibit conditions are removed and the dividers start normal operation. If the opposite divider is operating, then it provides a start signal to the quiescent divider when all the stages are in a "0" state. This signal removes the reset conditions so that the next input pulse which is simultaneously applied to both the dividers will start operating in time synchronism. Once a divider has started it is no longer effected by the operating status of its parallel divider.

While I have described above the principles of my invention in connection with specific apparatus, it is to be clearly understood that this description is made only by way of example and not as a limitation to the scope of my invention as set forth in its object and in the accompanying claims.

I claim:

1. In a circuit having two redundant chains of digital dividers, which are cross-coupled so as to allow failures to be repaired without interruption of the output signal, the arrangement comprising:

first and second input means which are cross-coupled;
first and second divider flip-flops coupled to said first and second input means respectively;
first and second output signal means respectively coupled to the outputs of said first and second divider flip-flops;
first and second means for resetting said first and second divider flip-flops;
inhibit means coupled between said resetting means and said first and second output signaling means;
means coupling said resetting means to said first and second flip-flops;
first and second gating means coupled to another output of said first and second flip-flops, the output of said first and second gating means producing an indication signal of said first and second flip-flops being reset;
third and fourth gating means coupled to receive the indicating output from said first and second gating means respectively;
first additional means coupling said indicating signal from said first gating means to the input of said third gating means and second additional means coupling said indicating signal from said second gating means to the input of said fourth gating means; and
first and second feedback coupling means coupling respectively said third gating means to said first resetting means and coupling said fourth gating means to said second resetting means whereby, the inhibit means is removed from said first and second output signaling means so that said divider starts in synchronism with its opposite identical divider.

2. The arrangement of claim 1 wherein said first and second resetting means each include:

a charging circuit coupled to a source of potential;
a voltage comparator coupled to the output of said charging circuit; and
a control flip-flop which is switched by the output of said voltage comparator to produce a signal to reset each of the flip-flops of the associated divider and to inhibit the output of said first or second output signal means.

3. The arrangement of claim 2 wherein the input signal means comprise cross-coupled OR gates having their outputs coupled to the respective divider flip-flops.

4. The arrangement according to claim 3 wherein said first and second gating means each include an AND gate coupled to the output of each stage flip-flop of said divider to produce said indicative signal representing that the respective divider has been reset by said control flip-flop.

5. The arrangement according to claim 4 wherein said first and second AND gating means comprise two NAND gates which are serially connected to produce said indicative signal.

6. The arrangement of claim 5 wherein said indicative output is coupled to third and fourth AND gates, said third and fourth AND gate outputs are coupled by a feedback line to said first and second resetting means.

7. The arrangement according to claim 6 wherein said additional first and second additional coupling means cross-couple said indicative signal from said first to third AND gate and from said second to fourth AND gate whereby, a signal is produced indicating that its opposite number is or is not operating.

8. The arrangement of claim 7 wherein said third and fourth AND gates each include a first NAND gate receiving a sink input signal from the other chain, a second NAND gate couple to receive the output of said first NAND gate and a source of voltage, and a third NAND gate coupled to receive said indicative signal and the output from said second NAND gate, said third NAND gate to produce a feedback signal for said control flip-flop to switch said control flip-flop and remove the inhibit signal from said first and second output signal means.

9. The arrangement of claim 8 wherein said cross-coupled OR gates each include two parallel input NAND gates, one respectively coupled to each input signal of the cross-couple input, and their outputs being coupled to the input of another NAND gate whose output is then coupled to the input of said divider flip-flops.

10. The arrangement of claim 9 wherein said first and second output signal means each include an AND gate whose output is inhibited by said control flip-flop until said control flip-flop is switched by the feedback signal to remove the inhibit on the input of said first and second AND gate output signaling means and to permit the divider output to pass through the chain in synchronism.

References Cited

UNITED STATES PATENTS

| | | | |
|---|---|---|---|
| 3,363,111 | 1/1968 | Moreines | 307—219 X |
| 3,379,897 | 4/1968 | Kaminski | 307—225 |

JOHN S. HEYMAN, Primary Examiner

U.S. Cl. X.R.

307—215, 225; 328—49, 72